United States Patent
Tsai

Patent Number: 5,999,277
Date of Patent: Dec. 7, 1999

[54] IMAGE INFORMATION READING APPARATUS HAVING ROLLING ELEMENTS INTERPOSED BETWEEN A SHEET TABLE AND A CONTACT-TYPE SENSOR

[75] Inventor: Jenn-Tsair Tsai, Yang Mei Chen, Taiwan

[73] Assignee: Mustek Systems Inc., Taiwan

[21] Appl. No.: 08/886,543

[22] Filed: Jul. 1, 1997

[30] Foreign Application Priority Data

Apr. 14, 1997 [TW] Taiwan ................................ 86205798

[51] Int. Cl.⁶ .................................................. H04N 1/04
[52] U.S. Cl. ............................................ 358/498; 358/497
[58] Field of Search ................................. 358/497, 482, 358/483, 486, 487, 494, 474, 496

[56] References Cited

U.S. PATENT DOCUMENTS

| | | | |
|---|---|---|---|
| 4,743,974 | 5/1988 | Lockwood | 358/285 |
| 4,870,502 | 9/1989 | Drienhoff | 358/474 |
| 4,965,638 | 10/1990 | Hediger | 355/235 |
| 5,012,354 | 4/1991 | Tsuchiya | 358/474 |
| 5,373,372 | 12/1994 | Loewen | 358/486 |
| 5,392,100 | 2/1995 | Yoshida | 355/235 |
| 5,781,314 | 7/1998 | Mochizuki | 358/509 |

*Primary Examiner*—Jerome Grant, II
*Attorney, Agent, or Firm*—Pennie & Edmonds LLP

[57] ABSTRACT

The present invention discloses a new CIS information reading apparatus which employs rolling elements interposed between a sheet table and a CIS module for allowing the CIS module to roll over the bottom surface of the sheet table in linear direction. The CIS module is mounted on a pair of supports which uplift the CIS module in a manner that the CIS module presses tightly on the rolling elements to roll over the bottom surface of the sheet table. The pair of supports move along a pair of U grooves for guiding the CIS module along the sheet table. Since the rolling elements and the sheet table remain point or line contacts, so the friction between the CIS module and the sheet table will be very small. This helps to improve the picture duality of the images generated by the CIS module.

9 Claims, 4 Drawing Sheets

IMAGE INFORMATION READING APPARATUS HAVING ROLLING ELEMENTS INTERPOSED BETWEEN A SHEET TABLE AND A CONTACT-TYPE SENSOR

BACKGROUND OF THE INVENTION

A. Field of the Invention

The present invention relates to a CIS flatbed scanner, especially to a CIS scanner having rolling elements interposed between a CIS module and a sheet table, thereby to reduce friction therebetween while rolling over the bottom surface side of the sheet table.

B. Description of the Prior Art

It is known that the most commonly used photoelectric converting devices for flatbed scanners are CCD line image sensor and CIS contact sensor. A flatbed scanner preferably uses a CCD line image sensor because its scene depth is deeper and can generate better picture qualities of images. On the other hand, a CIS contact sensor is mostly used in fax machines or in paper-feeding type scanners because its scene depth is much shorter and its resolution louver.

Nevertheless, the trade-off for using a CCD line sensor is that the size of the flatbed scanner is restricted by the light path required for a CCD line sensor. For this reason, the size of the flatbed scanner can hardly be reduced in a great scale even with the aid of mirror arrays to reflect the light beams.

Recently, a new approach is trying to replace a CCD line sensor with a CIS contact sensor for producing flatbed scanners without the requirement of high image qualities. An advantage for this new approach is that it can save a lot of time and efforts in assembly and maintenance because a CIS contact sensor is modularized. All the necessary optical elements, such as mirrors, light source and a photoelectric converting device, are included in a compact module. Thus, a CIS module can help to simplify the inner structure of a scanner. Moreover, a CIS contact sensor is smaller and lighter than a CCD line sensor. With a CIS contact sensor, the scanner can be portable with height around 30 mm. Nevertheless, this new approach did not prevail. The main reason is because the scene depth of a CIS contact sensor is only about 0.3 mm. Based on the structure of a conventional flatbed scanner, it is very difficult to assure the sheet remains within the scene depth of a CIS module. Even a small manufacture error or structure distortion may affect the picture quality of the images.

SUMMARY OF THE INVENTION

Accordingly, it is an object of the present invention to provide a CIS scanner which applies rolling elements interposed between a CIS module and a sheet table for reducing friction therebetween while rolling over the bottom surface side of the sheet table.

It is another object of the present invention to provide a new guiding and supporting structure for keeping a sheet in focus, thereby to provide stable picture quality of images.

It is a further object of the present invention to provide a CIS scanner with a simple structure, thereby to reduce manufacture cost and maintenance fee.

Preferred embodiments of the present invention preferably include a sheet table, a CIS module, a plurality of rolling elements, a guiding device, and a driving device. The CIS module is disposed beneath the sheet table with a plurality of rolling elements interposed therebetween. The CIS module is mounted on a pair of supports which uplift the CIS module in a manner that the CIS module presses tightly on the rolling elements to roll over the bottom surface of the sheet table. The pair of supports move along a pair of U grooves for guiding the CIS module along the sheet table. Since the rolling elements and the sheet table remain point or line contacts, so the friction between the CIS module and the sheet table will be very small. This helps to improve the picture quality of the images generated by the CIS module.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

Figure 1:
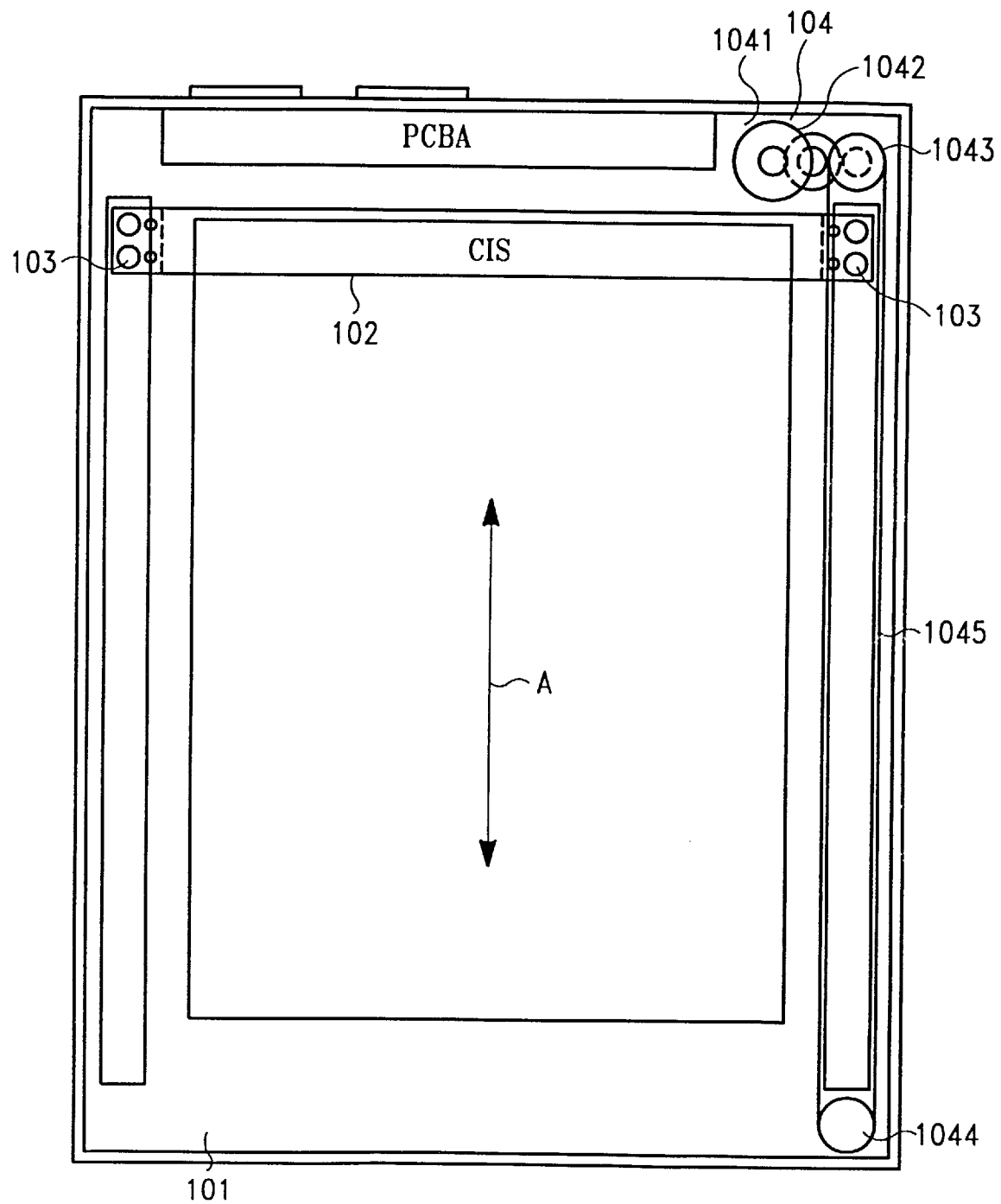
FIG. 1 is a perspective top view schematically showing the structure of the preferred embodiment of the invention.

The invention intends to control the document sheet in focus by making the CIS module contact tightly with the bottom surface of the sheet table while moving along the sheet table. Thus, the invention applies rolling elements interposed between the sheet table and the CIS module to reduce the friction between the sheet table and the CIS module. Refer to FIG. 1, the invention mainly comprises: a sheet table 101, a CIS module 102, rolling elements 103, guiding device (not shown), and driving device 104. The sheet table 101 made of glass or translucent material is for placing document sheets. The CIS module 102 is in a bar shape having the length equal to or greater than one side of the sheet table for reading and converting the image information into digital signals.

The rolling elements 103 are installed on two sides of the CIS module 102. The number of the rolling elements 103 shall be at least 3 for keeping the balance of the CIS module 102 while rolling over the bottom surface side of the sheet table 101 along a longitudinal direction a. The CIS module 102 is uplifted by a pair of supports (not shown in FIG. 1) f,r contacting tightly with the bottom surface side of the sheet table 101. The driving device 104 includes a driving motor 1041, a gear set 1042, a pulley set 1043, 1044 and a conveying element 1045. The driving motor 1041 drives the gear set 1042 which further drives the pulley set 1043, 1044. The conveying device 1045 is a steel wire rope or a timing belt in a shape of a closed-loop. The conveying device 1045 connects to the CIS module 102 and surrounds the pulley set 1043, 1044. When the conveying device 1045 is driven, it will convey the CIS module 102 from one end of the sheet table 101 to the other end of the sheet table 101.

Figure 2A:
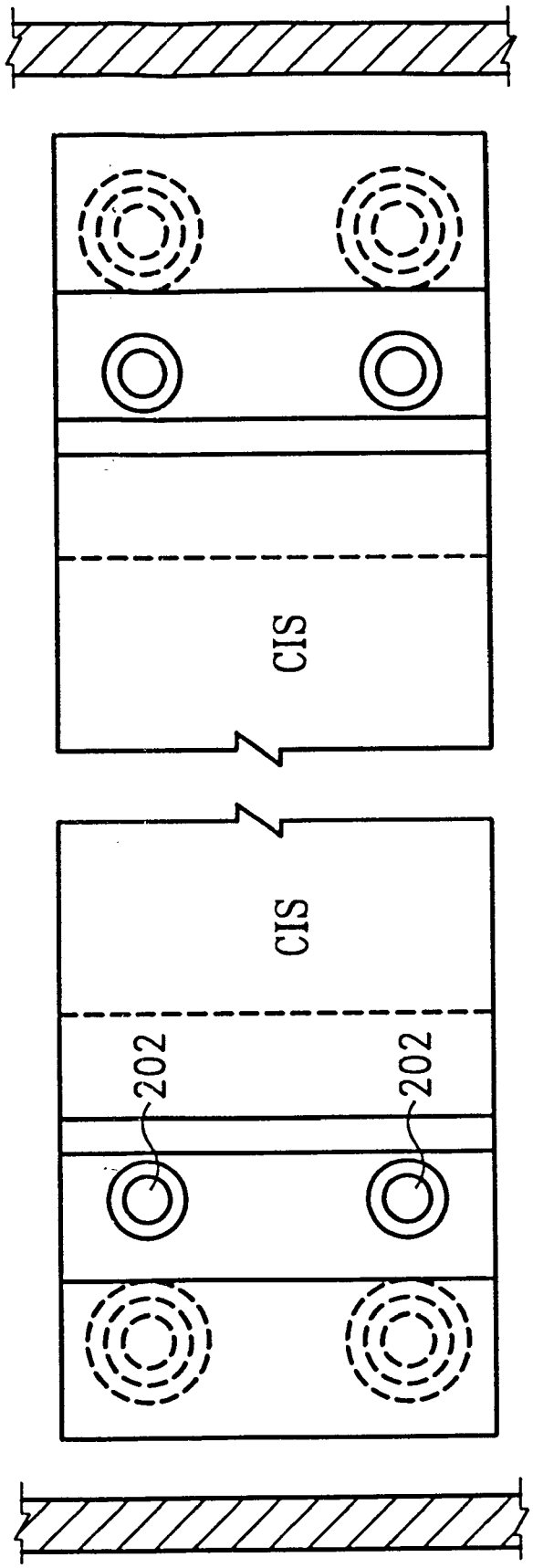
FIG. 2A is a perspective top view schematically :showing the positions of the rolling elements and the CIS module according to the preferred embodiment of the invention.
Figure 2B:
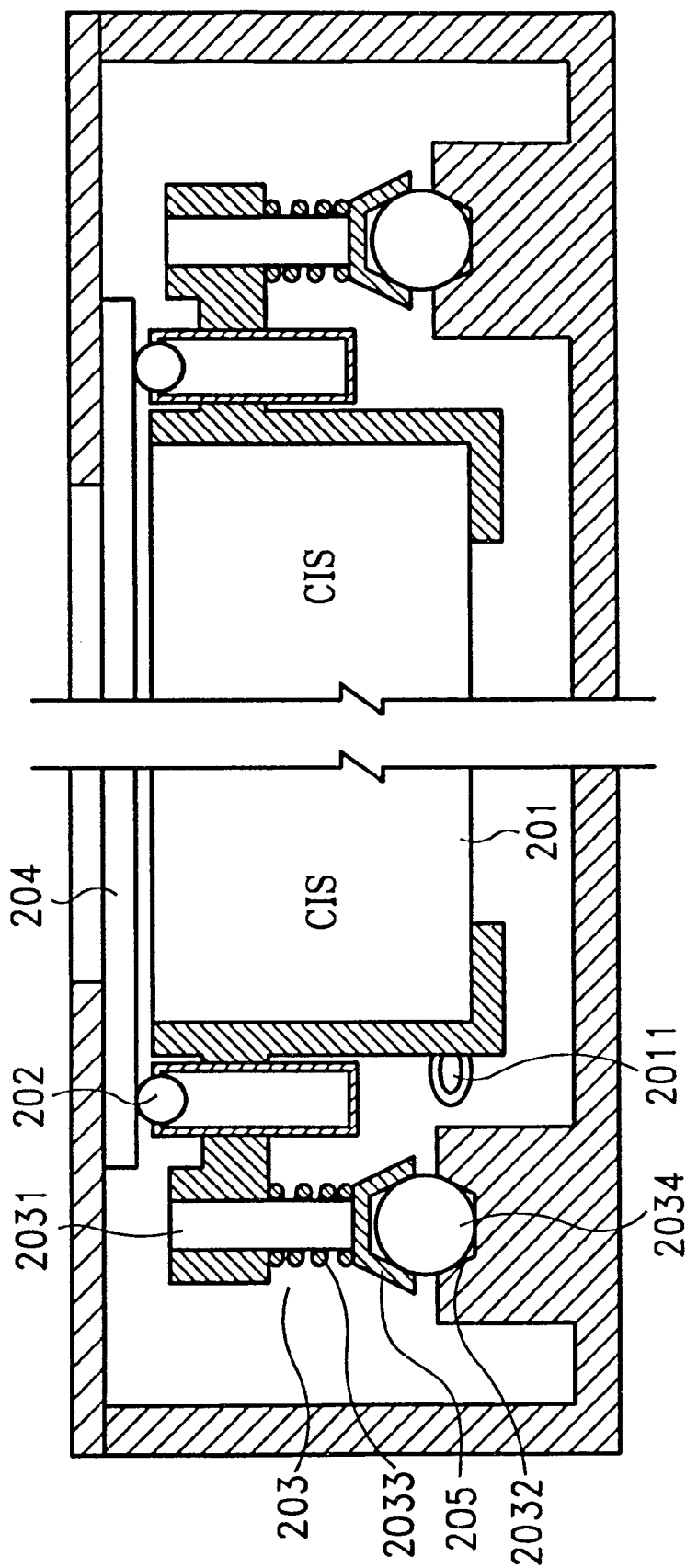
FIG. 2B is a perspective side view schematically showing the structure of the preferred embodiment of the invention.

The structure of the invention can be illustrated more clearly in FIG. 2A and FIG. 2B. Refer to FIG. 2B, the rolling elements 202 such as balls or spring supports are installed on the two sides of the CIS module 201 and interposed between the CIS module 201 and the sheet table 204. The space between the CIS module 201 and the sheet table 204 is determined by the size of the rolling elements 202. Thus, changing the size of the rolling elements 202 can adjust the space between the CIS module 201 and the sheet table 204.

The rolling elements 202 and the sheet table 204 only have point contacts so that the friction therebetween can be minimum. The number of the rolling elements 202 is at least 3, two on the same side of the CIS module 201 while the rest on the other side of the CIS module 201 to keep the balance of the CIS module 201. Refer to FIG. 2A for the relative positions of the elements.

The rolling elements 202 are coupled to the guiding device 203. The guiding device 203 comprises a pair of supports 2031, a pair of U grooves 2032, and balls 2034. The bottom end of each support 2031 has a cap 205 for holding a ball 2034. Under the ball 2034, there is a corresponding U groove 2032. The support 2031 can move along the U groove 2032 with the rotation of the ball 2034. The supports 2031 are slide shafts surrounded with elastic elements 2033, such as spring coils, for lifting the CIS module 201 to contact tightly with the bottom surface side of the sheet table 203. At the bottom of the CIS module 201, there is a hook 2011 for coupling to the conveying device 1045 (Refer to FIG. 1).

Figure 3:
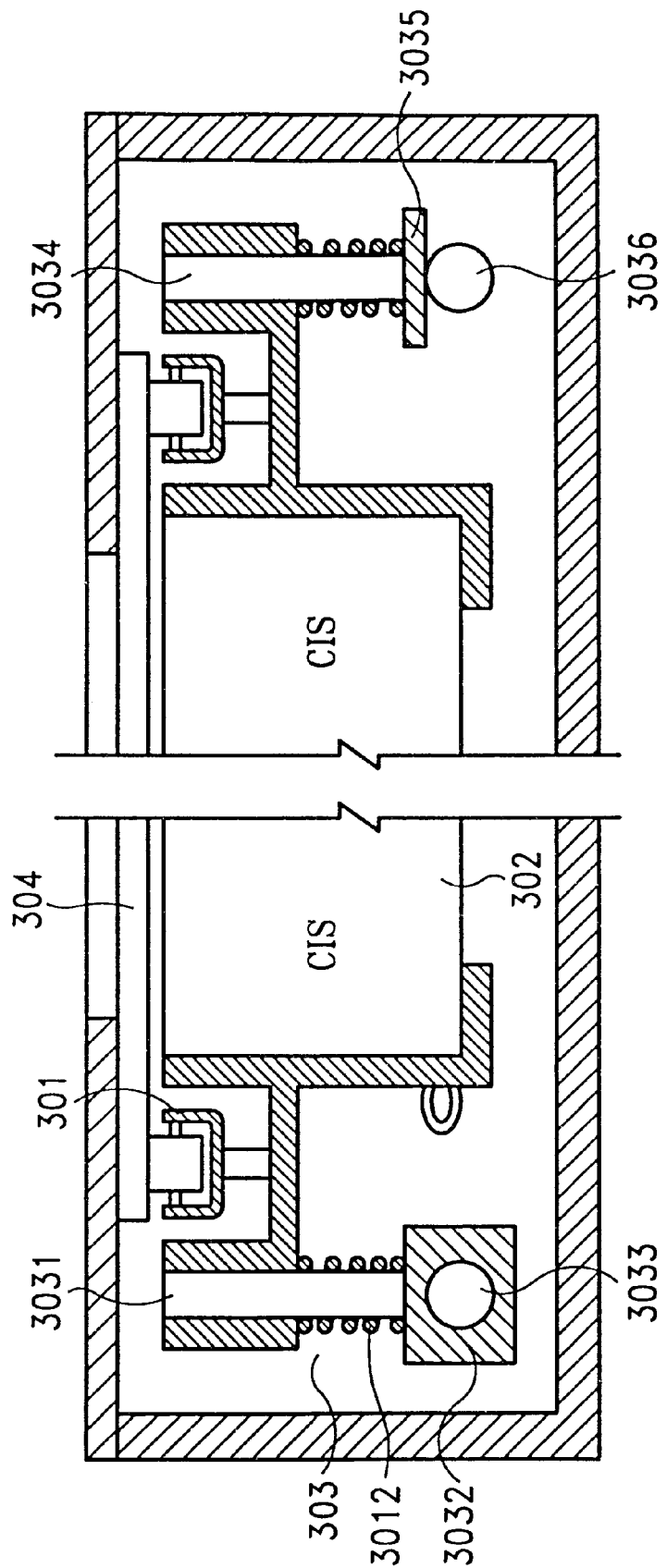
FIG. 3 is a perspective side view schematically showing the structure of another preferred embodiment of the invention.

A preferred embodiment has been described in detail hereinabove. It is to be understood that the scope of the invention also comprehends embodiments different from the one described, yet within the scope of the claims. For example, the rolling elements can be replaced with pulleys. The guiding device also can be modified as in that of FIG. 3. Refer to FIG. 3, the rolling elements 301 can be pulleys which are implemented on two sides of the CIS module 302. Changing the size of the rolling elements 301 can adjust the space between the CIS module 302 and the sheet table 304. The number of the rolling elements 301 shall also be at least 3 to keep the balance of the CIS module 302. The guiding device 303 is similar to that of FIG. 2B. The guiding device 303 comprises supports 3031 and 3034 which are both slide shafts surrounded with spring coils 3012. The elasticity of the spring coil 3012 can lift the CIS module 302 to contact tightly with the bottom surface side of the sheet table 304, thereby to keep the sheet in focus.

At the bottom ends of the supports 3031, there is a slotted stand 3032 for holding a rail rod 3033. At the bottom ends of the supports 3034, there is a plane stand 3035 for mounting on the other rail rod 3036. The rail rods 3033 and 3036 are parallel to each other for allowing the CIS module 302 to move smoothly along the sheet table 304. The plane stand 3035 design of the rail rods 3033, 3036 can reduce the vibration of the CIS module 302 while moving on the rail rods 3033 and 3036. Consequently, the CIS module 302 can roll over the bottom surface side of the sheet table 304 while moving along the sheet table 304 on the rail rods 3033 and 3036. For the functions of the remaining elements, please refer to the previous descriptions of FIGS. 2A and 2B.

To sum up, the invention employs rolling elements to provide a point or a line contact between the CIS module and the sheet table, thereby to reduce friction therebetween. The invention also applies slide shafts surrounded with spring coils to uplift the CIS module to contact tightly with the bottom surface side of the sheet table with rolling elements interposed therebetween, thereby to control the sheet in focus. The structure of the invention is so simple that the height of the scanner can be reduced to 30 mm. The manufacture cost and maintenance fee can also be reduced. More importantly, the invention can assure that a sheet stay within the scene depth of the CIS module, so as to guarantee better picture quality of images.

It should be understood that various alternatives to the structures described herein may be employed in practicing the present invention. It is intended that the following claims define the invention and that the structure within the scope of these claims and their equivalents be covered thereby.

What is claimed is:

1. An image information reading apparatus comprising:
    a sheet table on top of a housing for supporting a document sheet, said sheet table having a longitudinal direction;
    a contact-type image sensor (CIS) module disposed beneath said sheet table;
    two rolling means, each rolling means adjacent to either side of said CIS module, each of said rolling means comprising at least one ball arranged to contact said sheet table;
    a pair of guiding means, each guiding means engaged to a corresponding rolling means for carrying and positioning said CIS module such that said CIS module is biased toward a bottom surface of said sheet table, said at least one ball being interposed between said sheet table and said guiding means; and
    driving means connected to said CIS module for moving said CIS module along said longitudinal direction.

2. The apparatus as claimed in claim 1, wherein said guiding means comprises:
    a pair of supports, each support adjacent to one of said rolling means and having a cap at a bottom portion thereof;
    a pair of grooves parallel to each other, each groove facing a corresponding cap of one of said pair of supports, and fixed to an inner bottom of said housing along the longitudinal direction of said sheet table; and
    a pair of balls, each ball interposed between a groove and its corresponding cap for moving said CIS module along said pair of grooves.

3. The apparatus as claimed in claim 1, wherein the number of said balls at least three.

4. The apparatus as claimed in claim 2, wherein said pair of supports are slide shafts, each slide shaft being surrounded by a spring coil.

5. An image information reading apparatus comprising:
    a sheet table on top of a housing for supporting a document sheet, said sheet table having a longitudinal direction;
    a CIS module disposed beneath said sheet table;
    two pulleys, each pulley adjacent to either side of said CIS module for contacting a bottom surface side of said sheet table;
    a pair of guiding means, each connected to one of said pulleys for carrying, said CIS module such that said CIS module is biased toward the bottom surface side of said sheet table with said one pulley interposed between said sheet table and said guiding means; and
    driving means connected to said CIS module for moving said CIS module along said longitudinal direction, wherein said guiding means comprises:
    a pair of supports, each support adjacent to one of said pulleys, one of said pair of supports having a slotted stand, and the other of said pair of supports having a plane stand; and
    a pair of shafts parallel to each other for supporting said pair of supports to slide thereon, one of said shafts being disposed under said plane stand and the other of said shafts being engaged to said slotted stand.

6. The apparatus as claimed in claim 5, wherein said pair of supports are slide shafts, each slide shaft being surrounded by a spring coil.

7. An image information reading apparatus comprising:

a sheet table on top of a housing for supporting a document sheet, said sheet table having a longitudinal direction;

a CIS module disposed beneath said sheet table;

two rolling means, each rolling means adjacent to either side of said CIS module and having at least one ball arranged to contact said sheet table;

a pair of supports, each support adjacent to a corresponding rolling means and having a cap at a bottom portion thereof;

a pair of grooves parallel to each other and extending along said longitudinal direction, each groove facing a corresponding cap and being fixed to an inner bottom of said housing;

a ball interposed between each of said caps and its corresponding groove, for moving said CIS module along said grooves; and driving means connected to said CIS module for moving said CIS module along said longitudinal direction.

8. The apparatus as claimed in claim 7, wherein each of said rolling means comprises a spring support.

9. The apparatus as claimed in claim 7, wherein said pair of supports are slide shafts each surrounded with a spring coil.

* * * * *